United States Patent [19]
VanDeMark

[11] Patent Number: 5,092,118
[45] Date of Patent: Mar. 3, 1992

[54] NON-METALLIC LINK AND CHAIN

[75] Inventor: Paul J. VanDeMark, Knoxville, Tenn.

[73] Assignee: Jeffrey Chain Corporation, Morristown, Tenn.

[21] Appl. No.: 639,081

[22] Filed: Jan. 9, 1991

[51] Int. Cl.⁵ .......................................... F16G 13/06
[52] U.S. Cl. .................................... 59/84; 59/85; 59/5; 474/207; 474/234; 198/851
[58] Field of Search .............. 59/5, 78, 84, 85, 86; 474/207, 223, 224, 225, 226, 227, 228, 234; 198/851

[56] References Cited

U.S. PATENT DOCUMENTS

| | | | |
|---|---|---|---|
| 2,400,854 | 5/1946 | St. Pierre | 59/84 |
| 2,589,355 | 3/1952 | Faber | 74/254 |
| 2,860,520 | 11/1958 | Sull | 74/254 |
| 4,123,947 | 11/1978 | Smith et al. | 74/245 |
| 4,220,052 | 9/1980 | Sheldon | 474/207 |
| 4,250,764 | 2/1981 | Grant | 474/207 |
| 4,271,663 | 6/1981 | Templin et al. | 59/84 |
| 4,272,952 | 6/1981 | Graham | 59/84 |
| 4,355,502 | 10/1982 | Sheldon | 59/84 |
| 4,585,116 | 4/1986 | Albrecht | 198/729 |
| 4,636,181 | 1/1987 | Savolainen et al. | 198/850 |

FOREIGN PATENT DOCUMENTS 1444575 12/1988 U.S.S.R. ....................... 59/85

Primary Examiner—David Jones
Attorney, Agent, or Firm—Luedeka, Hodges, Neely & Graham

[57] ABSTRACT

A chain link having a pair of spaced sidebars provided with a set of aligned bores and a round pin positioned within so as to extend through the aligned bores utilizes sidebars and a pin which cooperate in a manner which positively secures the pin in position within the bores and which accommodates a removal of the pin from the bores in a manner which prevents damage to the link components. The pin has a head on one end and an annular rib on its other end, and the sidewall of one of the aligned bores possesses a diameter which tapers in size from one end of the bore to the other end thereof and is adapted to flex outwardly to accommodate the passage of the annular rib therethrough.

16 Claims, 3 Drawing Sheets

NON-METALLIC LINK AND CHAIN

BACKGROUND OF THE INVENTION

This invention relates generally to link chains and relates more particularly to the means by which adjacent links of a chain are pivotally coupled together.

The type of chain with which this invention is concerned is commonly referred to as a drive chain having a plurality of links coupled together for pivotal movement about parallel axes. Each link includes a pair of opposing sidebars which are joined to the sidebars of an adjacent link by a connecting pin. Examples of chains of this type are shown and described in U.S. Pat. Nos. 4,123,947, 4,220,052, 4,271,663 and 2,589,355.

It would be desirable to provide a link for a chain of the aforedescribed type having a connecting pin which is positively maintained in position through the sidebars of the link and which may be removed from the sidebars for uncoupling adjacent links in a manner which causes no damage to the link components.

Accordingly, it is an object of the present invention to provide a new and improved link for a chain having sidebars which are positively, yet releasably, connected to the sidebars of an adjacent link.

Another object of the present invention is to provide such a link having a connecting pin which resists accidental removal from the sidebars through which the pin extends.

Still another object of the present invention is to provide such a link having a connecting pin and sidebars which can be readily reassembled following removal of the connecting pin from the sidebars.

Yet another object of the present invention is to provide such a link which is uncomplicated in construction and effective in operation.

A further object of the present invention is to provide a chain which utilizes such a link.

SUMMARY OF THE INVENTION

This invention resides in a chain link having a pair of spaced sidebars provided with a set of aligned bores and an elongated round pin positioned within so as to extend through the aligned bores.

One end of the pin includes a head and the other end of the pin includes a radially outwardly-protruding annular rib. The pin is insertable rib-end-first in sequence through the bore of one sidebar and the bore of the other of the sidebars so that the head end of the pin is fitted through the one sidebar and the rib-end of the pin is fitted through the other sidebar and so that the pair of sidebars are captured between the head and the annular rib of the pin. The bore of the other sidebar tapers to a diameter which is slightly smaller than that of the annular rib and is constructed of a material which permits the sidewalls of its bore to flex outwardly to accommodate the passage of the annular rib therethrough. In addition, the annular rib has surfaces on its opposite sides which are sloped relative to the longitudinal axis of the pin to facilitate the movement of the annular rib through the bore of the other sidebar upon insertion and removal of the pin.

DETAILED DESCRIPTION OF THE ILLUSTRATED EMBODIMENT

Figure 1:
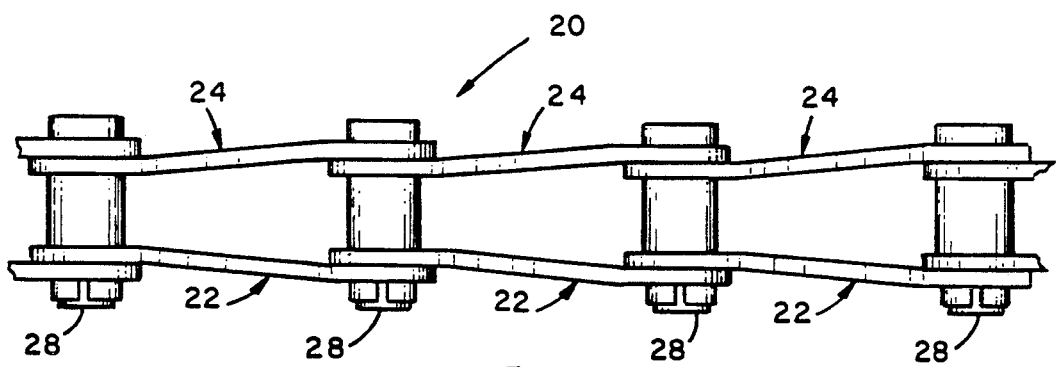
FIG. 1 is a fragmentary plan view of a chain having a link embodying various features of the present invention.
Figure 2:
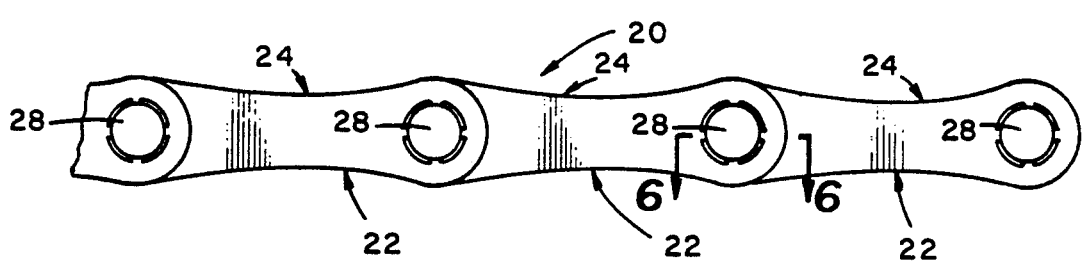
FIG. 2 is a fragmentary elevational view of the FIG. 1 chain.

Turning now to the drawings in greater detail and considering first FIGS. 1 and 2, there is illustrated a flexible chain 20 comprised of a plurality of non-metallic links 22 of like construction. The chain 20 is of a type commonly used to transmit power from a rotating drive member to a rotatable driven member, and is particularly well-suited for use in an environment which would normally be corrosive to metallic chains. Each link 22 is pivotally connected to an adjacent link 22 in a manner described herein which securely holds the links 22 together for use of the chain 20 and which accommodates a disassembling of the chain 20 without destruction of the link components.

Figure 3:
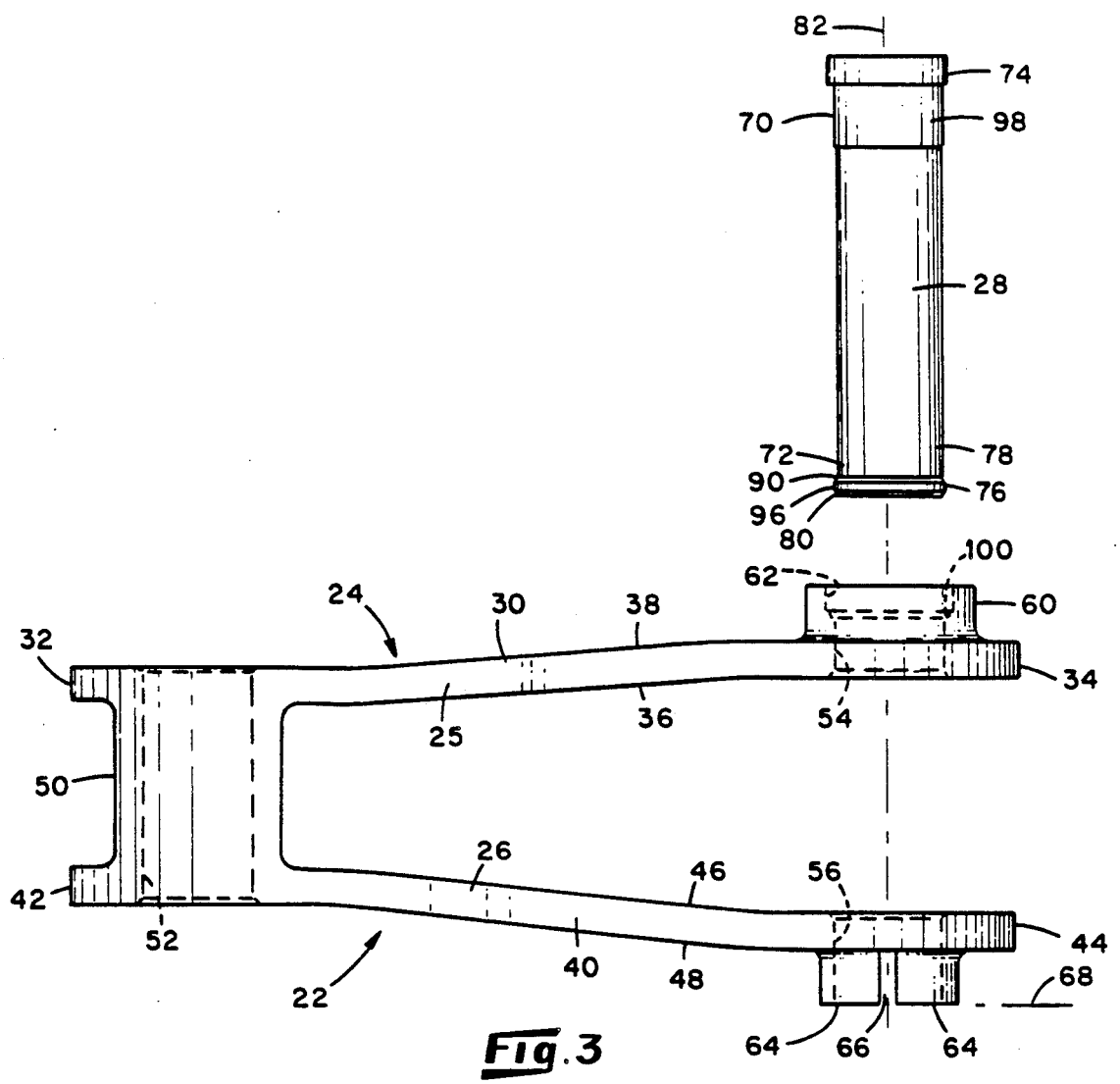
FIG. 3 is a plan view of one link of the chain of FIG. 1 shown with its connecting pin removed from its sidebars.

Each link 22 includes means, generally indicated 24, defining a pair of sidebars 25, 26 and a connecting pin 28 for joining the sidebars 25, 26 of one link 22 to the sidebars 25, 26 of an adjacent link 22. As best shown in FIG. 3, each sidebar 25 includes a body 30 having two opposite ends 32, 34 and two opposite side faces 36, 38. Each sidebar 26 includes a body 40 having two opposite ends 42, 44 and two opposite side faces 46, 48. Each sidebar body 30 or 40 is appropriately bent between its ends so as to provide each sidebar 25 or 26 with an arcuate configuration as viewed in the plan view of FIG. 3. The sidebar bodies 30, 40 are arranged so that the side faces 36 and 46 generally face one another and are maintained in a spaced relationship with one another by a spacer portion 50 extending between the ends 32, 42 of the sidebar bodies 30, 40. With the sidebar bodies arranged in the manner illustrated in FIG. 3, the body ends 34, 44 are spaced farther apart than are the body ends 32, 42. As will be apparent herein, the spacing provided between the body ends 34, 44 of one link 22 is sized to receive the body ends 32, 42 of another link 22 for connection of the links 22, 22 together.

Figure 4:
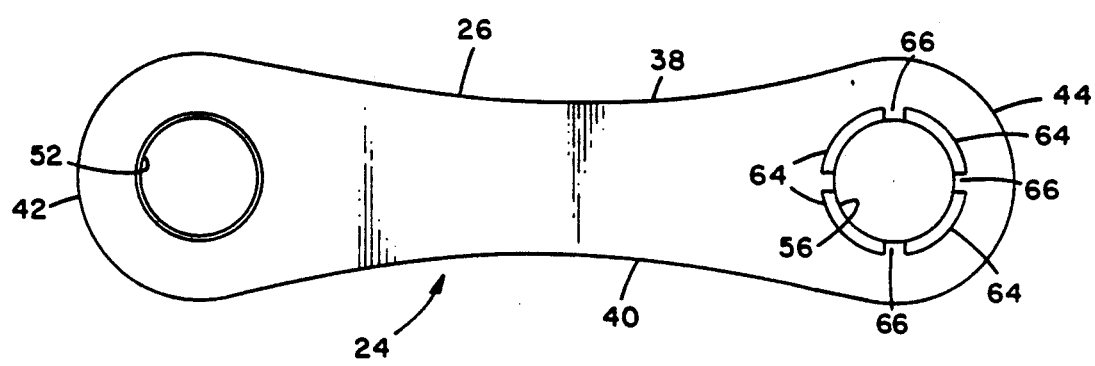
FIG. 4 is an elevational view of the sidebars of the FIG. 3 link.

With reference to FIG. 4, the sidebar-defining means 24 includes a bore 52 which extends through the body ends 32, 42 and spacer portion 50 and further includes a set of aligned bores 54, 56 which extend through the body ends 34 and 44. The bore 52 extends substantially centrally through the spacer portion 50 and opens out of the faces 38, 48 of the sidebar bodies 30, 40 at a chamfered bore entrance. Each of the bores 54 and 56 open out of the corresponding sidebar face 36 or 46 at a chamfered entrance. The bore 52 possesses a diameter which is about equal to that of the bore 54 provided in the end 34 of the sidebar 25, and the bore 56 possesses sidewalls which generally taper from one diameter as measured across the sidebar face 46 to a smaller diameter as measured across its opposite end for a reason apparent herein.

The body 30 of the sidebar 25 further includes a collar portion 60 which extends generally from the sidebar face 38. The collar portion 60 encircles the entrance to the bore 54 on the sidebar face 38 so that portions of the inner walls of the collar portion 60 provide portions of the sidewalls of the bore 54. The collar portion 60 also includes a circular recess 62 opening out of the collar portion 60 and away from the sidebar face 30. As will be apparent herein, the recess 62 is adapted to accept the head of the connecting pin 28 when the pin 28 is positioned within the aligned bores 54, 56.

The body 40 of the sidebar 26 further includes a plurality of protuberances 64 which extend generally from the sidebar face 48. The protuberances 64 collectively encircle the entrance to the bore 56 on the sidebar face 48 so that the inner walls of the protuberances 64 provide portions of the sidewalls of the bore 56. In the depicted link 20, there are four arcuate protuberances 64 which are positioned about the bore 64 and which are spaced from one another by a gap 66 of preselected width. The protuberances 74 extend from the sidebar face 30 by an equal amount and terminate in a plane 68 (FIG. 3) oriented generally perpendicular to the longitudinal axis of the bore 56.

The sidebar-defining means 24 of each link 22 is formed out of a relatively hard plastic which provides the bodies of the sidebars 25, 26 with a degree of resiliency. More particularly, the material out of which the sidebar-defining means 24 is constructed provides the protuberances 74 with a degree of flexibility so that the portions of the sidewalls of the bore 56 provided by the protuberances 74 flex radially outwardly to accommodate the passage of the pin 28 therethrough in a manner described herein. By way of example, the sidebar-defining means 24 may be constructed out of a glass-filled thermoplastic polyester, such as a modified polybutylene terephthalate reinforced with between 20% and 50%, and preferably 30%, fiberglass fibers. Such a glass-filled thermoplastic polyester is available from Thermofil of Brighton, Michigan under the trade designation El-30FG-0103 and is also available from other companies such as BASF Corp. of Detroit, Michigan, and ICI/LNT Corp., of Exton, Pennsylvania.

With reference still to FIG. 3, the connecting pin 28 of each link 22 is elongated in shape and includes a head-end portion 70 adjacent one end of the pin 28 and a rib-end portion 72 adjacent the other end of the pin 28. In addition, the pin 28 is round so that any transverse cross section taken through the pin 28 is circular. The pin 28 is formed out of a relatively hard plastic, and an axially-extending bore 75 (FIGS. 5 and 6) opens out of the rib-end portion 72. By way of example, the pin 28 may be constructed out of a twenty-five percent glass coupled acetal based copolymer. Such a copolymer is commercially available from Thermofil of Brighton, Michigan under the trade designation N333FG.

Figure 6:
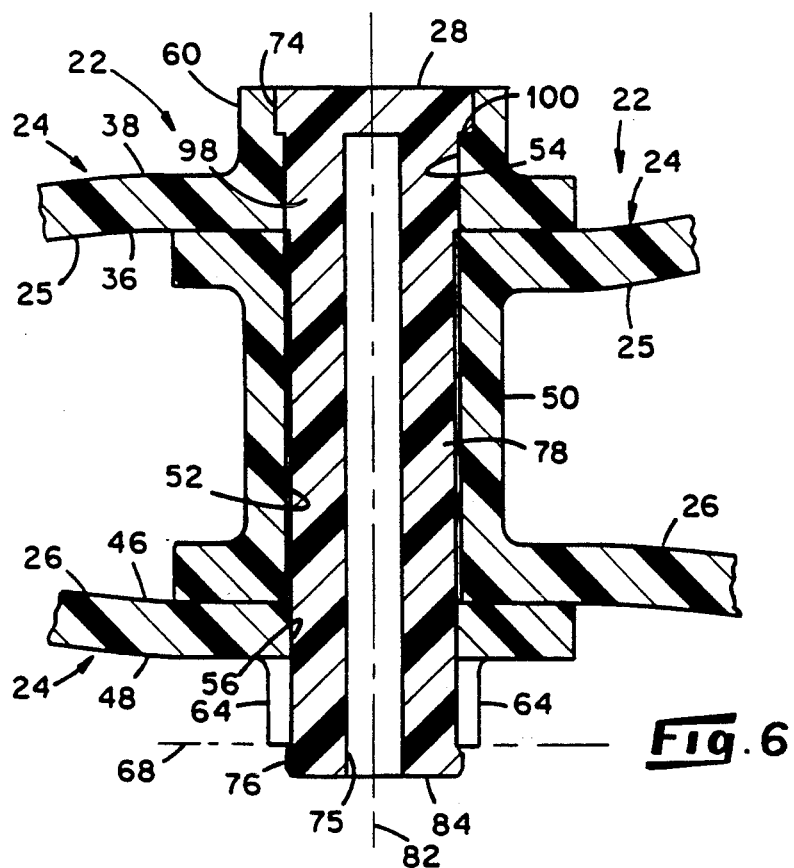
FIG. 6 is a cross-sectional view taken about along line 6—6 of FIG. 2.

When the pin 28 is properly positioned within the sidebar-defining means 24, the head-end portion 70 is closely fitted, i.e., in an interference fit, within the bore 54 of the sidebar body 30 and the rib-end portion 72 is closely fitted, i.e., in an interference fit, within the bore 56 of the sidebar body 32. To assemble the link 22, the pin 28 is inserted rib-end-first in sequence through the sidebar bore 54 and the sidebar bore 56. The head-end portion 70 includes a head 74 which prevents the pin 28 from passing completely through the sidebar bore 54, and the rib-end portion 72 includes an annular rib 76. The pin 28 is appropriately sized so that when fully inserted through the aligned bores 54 and 56, the sidebar bodies 30, 40 are captured between the head 74 and the rib 56 of the pin 28 as illustrated in FIG. 6. The head 7 is appropriately sized to be accepted by the circular recess 62 of the collar portion 60 when the pin 28 is fully inserted within the aligned bores 54 and 56.

The rib-end portion 72 of the pin 28 includes a cylindrical section 78 from which the rib 76 extends and which is sized to be closely accepted by the sidebar bore 56 when the rib-end portion 72 is fitted therein. To this end, the diameter of the cylindrical section 78 corresponds generally with the diameter of the tapered sidebar bore 56, as measured generally across the sidebar face 46, and the annular rib 76 has a diameter which is slightly greater than that of the sidebar bore 56 as measured across the plane 68 (FIG. 3) so that the rib 76 must be forced through the bore 56 upon assembly of the link 22. Upon full insertion of the rib-end portion 72 through the bore 56 as shown in FIG. 6, the annular rib 76 clears the protuberances 64.

Figure 5:
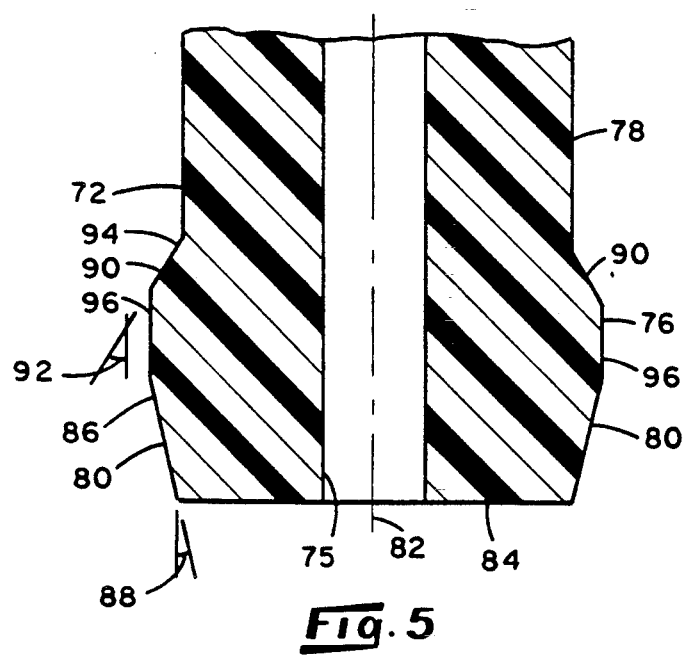
FIG. 5 is a longitudinal cross-sectional view of a portion of the pin of the FIG. 3 link drawn to a larger scale.

To facilitate the passage of the rib-end portion 72 through the bore 56 upon insertion of the pin 28 into place, the annular rib 76 has a sloped side 80 which enters the bore 56 in advance of the remainder of the rib 76. More specifically and as best shown in FIG. 5, the rib side 80 is provided with a frusto-conical ramp-like surface 86 which is sloped at an acute angle 88 with respect to the longitudinal axis 82 of the pin 28 so that the diameter of its frusto-conical form is smallest at the leading end, indicated 84, of the pin 28. For present purposes, the longitudinal axis 82 of the pin 28 is coincident with the central axis of the aligned bores 54, 56 when the link 22 is assembled. In the depicted embodiment, the diameter of the side surface 86 at the leading end 84 of the pin 28 is slightly smaller than that of the cylindrical section 78 of the rib-end portion 72. By way of example, the angle 88 may be between about ten and fifteen degrees, and preferably about 13.6 degrees.

To facilitate the removal of the rib-end portion 7 from the bore 56, the annular rib 76 has a sloped side 90 opposite the side 80 which enters the bore 56 in advance of the remainder of the rib 76 upon removal of the pin 28 from the sidebar 26. More specifically and as best shown in FIG. 5, the rib side 90 is provided with a frusto-conical ramp-like surface 94 which is sloped at an acute angle 92 with respect to the longitudinal axis 82 of the pin 28 so that the diameter of its frusto-conical form is smallest as measured across its cross section located farthest from the pin leading end 84. By way of example, the angle 92 may be between about twenty-five and thirty-five degrees, and preferably about thirty degrees.

The annular rib 76 also includes a cylindrical surface 96 disposed between the opposite rib sides 80, 90. The cylindrical surface 96 provides the outwardmost radial extremity of the rib 76, and as best shown in FIG. 5, the side surfaces 86 and 94 converge toward and terminate at the cylindrical surface 96.

Figure 7:
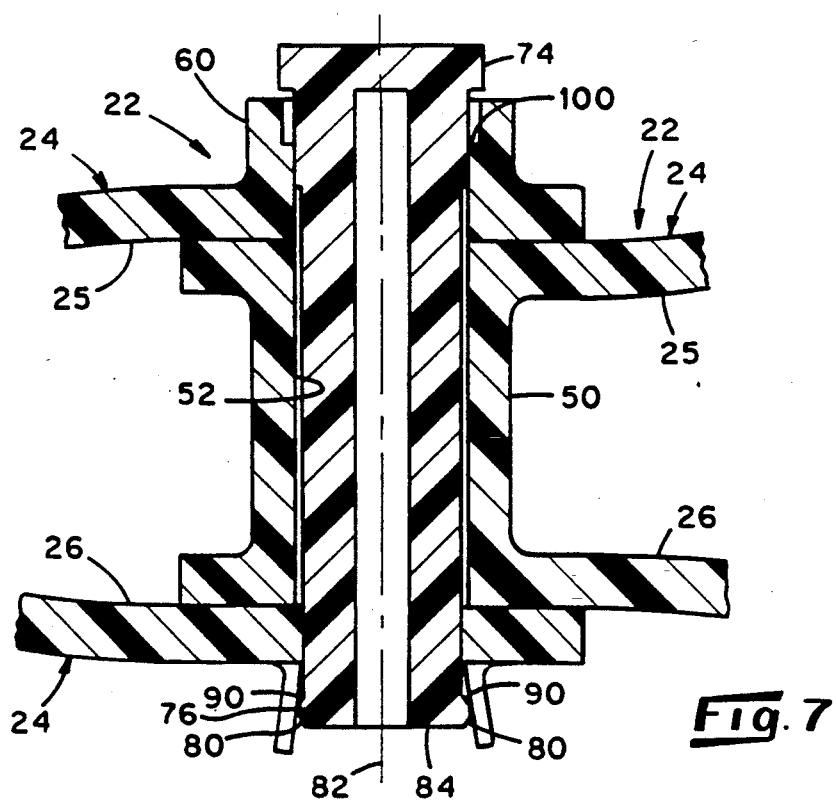
FIG. 7 is a view similar to that of FIG. 6 illustrating the connecting pin when positioned in a condition prior to full insertion of the pin through the sidebars.

When inserting the rib-end portion 72 into the bore 56, the leading end 84 of the pin 28 initially enters the bore 56 and the rib side surface 86 engages the tapered sidewalls of the bore 56 along a circular path of contact adjacent the sidebar face 46. As the pin 28 continues to be urged through the bore 56, the rib side surface 86 and the narrower regions of the sidewalls of the bore 56 act as cam and cam followers, respectively, to accommodate the passage of the rib 76 therethrough. In this connection, the sidewalls of the bore 56 flex outwardly along the narrower regions as shown in FIG. 7 in response to the movement of the rib side surface 84 therethrough and then return toward their unflexed condition as the rib side surface 94 exits the bore 56. As mentioned earlier, the material out of which the sidewall-defining means 24 is constructed permits the sidewalls of the bore 56 to flex as aforedescribed, and the gap 66 provided between each protuberance 64 facilitates the outward flexure of the portions of the bore sidewalls defined by the inner walls of the protuberances 64. Once the rib 76 passes completely through the bore 56 so that the rib side 90 clears the protuberances 64 as illustrated in FIG. 6, the memory of the material out of which the sidebar-defining means 24 is constructed returns the sidewalls of the bore 56 toward their unflexed condition at which the protuberances 64 tightly encircle the cylindrical section 78 of the pin 28.

When removing the rib-end portion 72 from the bore 56, the rib side surface 94 slide along the sidewalls of the bore 56 so that the surfaces of the bore 56 are forced to flex radially outwardly to accommodate the passage of the rib 76 therethrough. In this connection, the rib side surface 94 and the protuberances 64 act as cam and cam followers, respectively, as the pin 28 is urged out of the bore 56 so that the sidewalls of the bore 56 flex outwardly in response to the movement of the rib side surface 94 therethrough and then return to their unflexed condition as the rib side surface 86 is withdrawn from the bore 56.

With reference again to FIG. 3, the head-end portion 70 of the pin 28 includes a cylindrical section 98 disposed between the head 74 and cylindrical section 78 which possesses a smaller diameter than that of the head 74 and a larger diameter than that of the cylindrical section 78. The sidebar bore 54 and cylindrical section 98 are appropriately sized so that when the cylindrical section 98 is positioned within the bore 54, the section 98 is closely received by the sidewalls of the bore 54. Accordingly, the diameter of the bore 54 is about equal to the diameter of the cylindrical section 78. It is a feature of the link 22 that the rib-end portion 72 of the pin 28 may be moved through the sidebar bore 54 unobstructed by the sidewalls thereof when installing and removing the pin 28. Accordingly, the diameter of the bore 54 is no less than the diameter of the rib 76 as measured across its cylindrical surface 96.

When connecting adjacent links 22, 22 of the chain 20, the sidebar-defining means 24 of one link 22 is positioned between the ends 34, 44 of the sidebars 25, 26 of the other link 22 so that the bore 52 provided in one link 22 is aligned with the aligned bores 54, 56 as illustrated in FIG. 6. The pin 28 is then inserted rib-end-first in sequence through the sidebar bore 54 and sidebar bore 56 until the pin head 74 is received by the circular recess 62 provided in the collar portion 60 and the annular rib 76 has passed completely through the bore 56. As mentioned earlier, the diameter of the bore 52 is about equal to that of the bore 54 so that the annular rib 76 of the pin 28 moves unobstructed through the bore 52. When the pin 28 is fully inserted through the aligned bores 54, 56 as shown in FIG. 6, the pin head 74 engages the bottom, indicated 100, of the circular recess 62 provided in the collar portion 60 and the rib 76 is located below, as shown in FIG. 6, the ends of the protuberances 64. Accordingly, the distance as measured between the recess bottom 100 and the plane 68 at which the protuberances 64 terminate is no greater than the distance as measured between the pin head 74 and the rib side surface 94. With the pin 28 positioned within the aligned bores 52, 54, 56 as aforedescribed, the sidebar-defining means 24 of one link 22 is free to pivot about the pin 28 of the other link 22.

Advantages provided by the link 22 relate to the ease with which the link 22 is assembled and disassembled and the stability with which the pin 28 is maintained in place within the aligned bores 54, 56 of the sidebars 25, 26 as shown in FIG. 6. In other words, the pin 28, which has no flexing areas that move in or out or break due to stress concentrations, may be readily inserted into place through the sidebar bores 54, 56 or removed from the bores 54, 56, yet the cooperation between the sidebar protuberances 64 and the annular rib 76 and the interference fit between the pin 28 and bores 54, 56 resist accidental dislodgement or a backing out of the pin 28 from the bores 54, 56. In addition, the capacity of the sidewalls of the bore 56 to flex upon movement of the rib 76 through the bore 56 prevents damage to the link components upon assembly and disassembly of the link 22. If the link is therefore disassembled, each of its components can be reused when reassembling the link.

Another advantage provided by the link 22 relates to the fact that the flexure of the sidebar 26 accommodating the passage of the rib-end portion 72 through its bore 56 takes place, for the most part, within the protuberances 64 and not between the sidebar faces 46 and 48. The region between the sidebar faces 46 and 48 has been found to serve as the loading-carrying portion of the sidebar 26, and because the protuberances 84 are outboard of the faces 46, 48, the strength of the sidebar 26 is not adversely affected by the flexibility of the protuberances 64 but rather the strength is greatly enhanced due to the large cross sectional area at the slotted collar. A still further advantage relates to the fact that no additional elements, such as a cotter key, an o-ring or notches or link bores, are necessary for securing the pin 28 in place, and the recess 62 accepts the entirety of the head 74 to enhance the protection of the head 74.

For purposes of illustration, dimensions of the pin 28 are provided here as follows: the overall length of the pin 28 is about 3.875 inches; the length of the cylindrical section 98 is about 0.625 inches; the thickness of the head 74 is about 0.25 inches; the diameter of the cylindrical section 98 is between about 0.954 and 0.964 inches; the diameter of the cylindrical section 78 is between about 0.938 and 0.944 inches; the diameter of the annular rib 76 as measured across the cylindrical surface 96 is between about 0.952 and 0.954 inches. The length of the rib side 80 as measured along a path oriented parallel to the pin axis 82 is about 0.062 inches, the length of the rib side 90 as measured along a path oriented parallel to the pin axis 82 is about 0.0086 inches, and the length of the cylindrical surface 96 as measured along the length of the pin 82 is about 0.062 inches. The diameter of the pin leading end 84 is about 0.924 inches and the diameter of the central bore 75 of the pin 28 is about 0.3125 inches.

Sidebar-defining means 24 found to be well-suited for use with a pin 28 having the above-described dimensions and which provide the link 22 with a large amount of torque-transmitting strength possesses the following dimensions: the diameter of the sidebar bore 54 is between about 0.954 and 0.964 inches; the diameter of the recess 62 is about 1.125 inches; the diameter of the sidebar bore 56 preferably tapers from between 0.948 and 0.952 inches as measured across sidebar face 46 to between 0.939 and 0.944 inches as measured across the plane 68 at which the protuberances 64 terminate; the wall of each protuberance 64 is about 0.125 inches thick as measured radially thereacross and is about 0.375 inches in length as measured from the sidebar face 48. Each sidebar 25 or 26 is about 0.375 inches thick as measured between its opposite faces, and the center axes of the bore 52 and aligned bores 54, 56 are about 6.0 inches apart.

It will be understood that numerous modifications and substitutions may be had to the aforedescribed embodiment without departing from the spirit of the invention. Accordingly, the aforedescribed embodiment is intended for the purpose of illustration and not as limitation.

I claim:

1. A chain link comprising:
    a pair of spaced sidebars provided with a set of aligned bores; and
    an elongated round pin positioned within so as to extend through said aligned bores, said pin having two opposite ends, one end of said pin having a head and the other end of said pin having a radially outwardly-protruding annular rib, the pin being insertable rib-end-first in sequence through the bore of one sidebar and the bore of the other sidebar so that the head-end of the pin is fitted through said one sidebar and the rib-end of the pin is fitted through said other sidebar and so that the pair of sidebars are captured between the head and the annular rib of the pin, the bore of the other sidebar tapers in diameter to a diameter which is slightly smaller than that of the annular rib and said other sidebar is constructed of a material which permits the sidewalls of its bore to flex outwardly to accommodate the passage of the annular rib therethrough; and
    the annular rib having surfaces on opposite sides thereof which are sloped with respect to the longitudinal axis of the pin to facilitate the movement of the annular rib through the bore of said other sidebar upon insertion of the pin therethrough and upon removal of the pin therefrom.

2. The link as defined in claim 1 wherein said sidebars include outer faces which generally face in opposite directions, said other sidebar includes a plurality of protuberances which collectively surround the bore of said other sidebar on the outer face thereof and which provide a portion of the sidewalls of its bore, and said protuberances are adapted to flex radially outwardly in response to the movement of the annular rib into and out of the bore of said other sidebar.

3. The link as defined in claim 2 wherein the protuberances extend generally away from the outer face of said other sidebar and terminate in a plane oriented generally perpendicular to the central axis of the aligned bores, and the annular rib is moved completely through said plane when fully inserted through said aligned bores.

4. The link as defined in claim 2 wherein there are four protuberances regularly spaced about the entrance of the bore of said other sidebar on the outer face thereof.

5. The link as defined in claim 1 wherein the annular rib includes an annular periphery and the sloped side surfaces of the rib converge to the annular periphery.

6. The link as defined in claim 1 wherein one side of the rib is a leading side which enters the bore of said other sidebar in advance of the remainder of the rib when the pin is inserted into place through the aligned bores and the surface of said leading side is sloped with respect to the longitudinal axis of the pin at an angle of between ten and fifteen degrees.

7. The link as defined in claim 6 wherein the surface of the opposite side of the rib is sloped with respect to the longitudinal axis of the pin at an angle of between twenty-five and thirty-five degrees.

8. The link as defined in claim 1 wherein each of the sidebars and the pin are constructed of a relatively hard plastic.

9. A chain comprised of a plurality of links of like construction pivotally connected together wherein
    each link includes elongated means defining a pair of spaced sidebars provided with a set of aligned bores at one end of said elongated means and a bore at the other end of said elongated means, the sidebar-defining means of one link being arranged between the sidebars of an adjacent link so that the bore provided at the other end of the sidebar-defining means of one link is in registry with the aligned bores provided at the one end of the sidebar-defining means of the adjacent link,
    each link further including an elongated round pin positioned within so as to extend through the aligned bores provided at one end of the sidebar-defining means of the corresponding link and the bore provided at the other end of the sidebar-defining means of the adjacent link, said pin having two opposite ends, one end of said pin having a head and the other end of said pin having a radially outwardly-protruding annular rib, the pin being insertable rib-end-first through the aligned bores of the sidebar-defining means of the corresponding link so that the head end of the pin is fitted through one sidebar of the sidebar-defining means of the corresponding link and the rib end of the pin is fitted through the other sidebar of the sidebar-defining means of the corresponding link and so that said one sidebar and said other sidebar are captured between the head and the annular rib of the pin, the one bore of said other sidebar which is aligned with the bore of said one sidebar having a diameter which tapers to a diameter which is slightly smaller than that of the annular rib and said other sidebar being constructed of a material which permits the sidewalls of said one bore to flex outwardly to accommodate the passage of the annular rib therethrough; and
    the annular rib having surfaces on opposite sides thereof which are sloped with respect to the longitudinal axis of the pin to facilitate the movement of the annular rib through said one bore of said other sidebar upon insertion of the pin therethrough and upon removal of the pin therefrom.

10. The chain as defined in claim 9 wherein the sidebars of each link have outer faces which generally face in opposite directions, said other sidebar includes a plurality of protuberances which collectively surround said one bore of said other sidebar on the outer face thereof and which provide a portion of the sidewalls of said one bore, and said protuberances are adapted to flex radially outwardly in response to the movement of the annular rib into and out of said one bore of said other sidebar.

11. The chain as defined in claim 10 wherein the protuberances extend generally away from the outer face of said other sidebar and terminate in a plane oriented generally perpendicular to the central axis of the aligned bores, and the annular rib is moved completely through said plane when fully inserted through said aligned bores.

12. The chain as defined in claim 10 wherein there are four protuberances regularly spaced about the entrance of the bore of said other sidebar on the outer face thereof.

13. The chain as defined in claim 9 wherein the annular rib includes an annular periphery and the sloped side surfaces of the rib converge to the annular periphery.

14. The chain as defined in claim 9 wherein one side of the rib is a leading side which enters said one bore of said other sidebar in advance of the remainder of the rib when the pin is inserted into place through the aligned bores and the surface of said leading side is sloped with respect to the longitudinal axis of the pin at an angle of between ten and fifteen degrees.

15. The chain as defined in claim 14 wherein the surface of the opposite side of the rib is sloped with respect to the longitudinal axis of the pin at an angle of between twenty-five and thirty-five degrees.

16. The chain as defined in claim 9 wherein each of the sidebar-defining means and the pin of each link is constructed of a relatively hard plastic.

* * * * *